US011141772B2

(12) United States Patent
Schwochert

(10) Patent No.: US 11,141,772 B2
(45) Date of Patent: Oct. 12, 2021

(54) HYDROFORMING TOOL AND METHOD TO AUGMENT A RAM FORMING MACHINE

(71) Applicant: John Schwochert, Omro, WI (US)

(72) Inventor: John Schwochert, Omro, WI (US)

(73) Assignee: PROTO-1 MANUFACTURING, L.C.C., Winneconne, WI (US)

( * ) Notice: Subject to any disclaimer, the term of this patent is extended or adjusted under 35 U.S.C. 154(b) by 142 days.

(21) Appl. No.: 16/146,383

(22) Filed: Sep. 28, 2018

(65) Prior Publication Data
US 2019/0099797 A1    Apr. 4, 2019

Related U.S. Application Data

(60) Provisional application No. 62/564,446, filed on Sep. 28, 2017.

(51) Int. Cl.
*B21D 26/033* (2011.01)
*B21D 26/047* (2011.01)
*B21C 37/12* (2006.01)

(52) U.S. Cl.
CPC ......... *B21D 26/033* (2013.01); *B21D 26/047* (2013.01); *B21C 37/126* (2013.01); *B21C 37/128* (2013.01); *B60G 2206/012* (2013.01)

(58) Field of Classification Search
CPC .... B21D 26/00; B21D 26/027; B21D 26/031; B21D 26/033; B21D 26/041; B21D 26/047; B21D 37/14; B21C 37/126; B21C 37/128
USPC ............................................. 72/57, 60, 466.7
See application file for complete search history.

(56) References Cited

U.S. PATENT DOCUMENTS

| | | | | |
|---|---|---|---|---|
| 2,998,238 A * | 8/1961 | Kenline | ................. | B21D 24/02 267/119 |
| 4,326,402 A * | 4/1982 | Wallis | .................... | B21D 37/08 72/420 |
| 5,473,926 A * | 12/1995 | Futamura | ............... | B21D 43/05 72/404 |
| 9,416,840 B2 * | 8/2016 | Vandine | ................ | F16F 9/0227 |

* cited by examiner

*Primary Examiner* — Teresa M Ekiert
(74) *Attorney, Agent, or Firm* — Joseph S. Heino; Erin E. Kaprelian

(57) ABSTRACT

A system comprises a ram tool subassembly and a master die subassembly. The ram tool subassembly further comprises a tool stick, a back body, a piston assembly, a piston housing, and a pusher holder. The master die subassembly further comprises a bottom tooling plate, a bottom master jaw, a nose block, a top master jaw, and a top tooling plate.

9 Claims, 3 Drawing Sheets

HYDROFORMING TOOL AND METHOD TO AUGMENT A RAM FORMING MACHINE

FIELD OF THE INVENTION

The present invention relates generally to hydroforming machines and methods, including tube hydroforming machines. More particularly, the present invention relates to a removable hydroforming tool that mounts into an existing ram forming machine which allows for the forming of small non-ram formed tubes in an existing ram forming machine without the need to buy additional machinery.

BACKGROUND OF THE INVENTION

Hydroforming is a well-known process that is used for forming parts in many industries, for example, the automotive industry. Hydroforming is often used for shaping ductile metals, including low alloy steel, stainless steel, aluminum, and brass. Through hydroforming, the ductile metals are shaped into structurally stiff and strong pieces, including tubing.

Generally, the hydroforming process is performed in a very large machine that is specific to hydroforming. In the relatively simple case of a flat material, the process consists of providing a die-forming cavity defined within one half of two halves of a die. The cavity is defined in whatever shape is desired or required. The flat sheet of metal is then sandwiched between the two halves of the die. A high-pressure fluid is injected into one of the die halves. By injecting the high-pressure fluid, the sheet of metal is pushed, or formed, into the form of the die. Once formed, the fluid is withdrawn, the die halves are opened, and the formed object is removed from the die halves.

In the case of tubing, the process includes loading an unformed piece of tubing into the die-forming cavity. Again, the cavity is defined in whatever shape is desired or required. The halves of the die-forming cavity are then closed. The ends of the unformed tube are closed off by ram cylinders that cap each end of the tube. Once the ends are closed off, a high-pressure pump feeds forming fluid into the form. This creates the pressure needed to cause expansion of the tube into the desired shape. The fluid is then released or removed from the form and the ram cylinders retract. Once all cylinders retract, the upper half of the die cavity is opened, allowing access to the formed part.

Hydroforming according to the above methods use large hydroforming machines, which often have a high cost. Additionally, hydroforming machines may be limited in the size and/or type of parts they are able to form. Thus, in order to manufacture parts outside the limitations of an already-owned hydroforming machine, another hydroforming machine may need to be manufactured and/or purchased. Purchasing multiple hydroforming machines can quickly become expensive, particularly when a hydroforming machine is only used for specialized part manufacturing.

Accordingly, this inventor believes that there is a need for a simpler solution to accomplish the functionality of a hydroforming machine. This solution may use existing ram forming equipment to accomplish the intended result. The hydroforming tool (or hydroformer) of the present invention fulfills this need.

SUMMARY OF THE INVENTION

In view of the foregoing, the hydroforming tool of the present invention differs from the typical hydroforming process in the way that the pressure is created. In the present invention, the unformed tube is lowered into the lower cavity of the sliding day and over the edge of a stationary sealing nose. The die is then clamped shut. A single ram nose is fed forward to seal the opposite end of the unformed tube. A lower pressure but higher volume pump then begins to fill the unformed tube with fluid. When the tube has been filled, the single ram cylinder moves forward to compress the fluid. At the same time, it is feeding in the material to form the raw tube into the desired shape. The pressure is thus created by filling the unformed tube with compressible liquid and using the ram cylinder to generate the pressure to form the tube. The advantage to this hydroforming HydroRam® tool (HYDRORAM is a registered mark of Proto-1 Manufacturing, L.L.C.) is that the existing ram machine can be used to hydroform smaller parts without the need to purchase a large and expensive hydroforming machine that would otherwise be made specifically for such smaller part applications.

The foregoing and other features of the hydroforming tool of the present invention will be apparent from the detailed description that follows.

DETAILED DESCRIPTION

Figure 1:
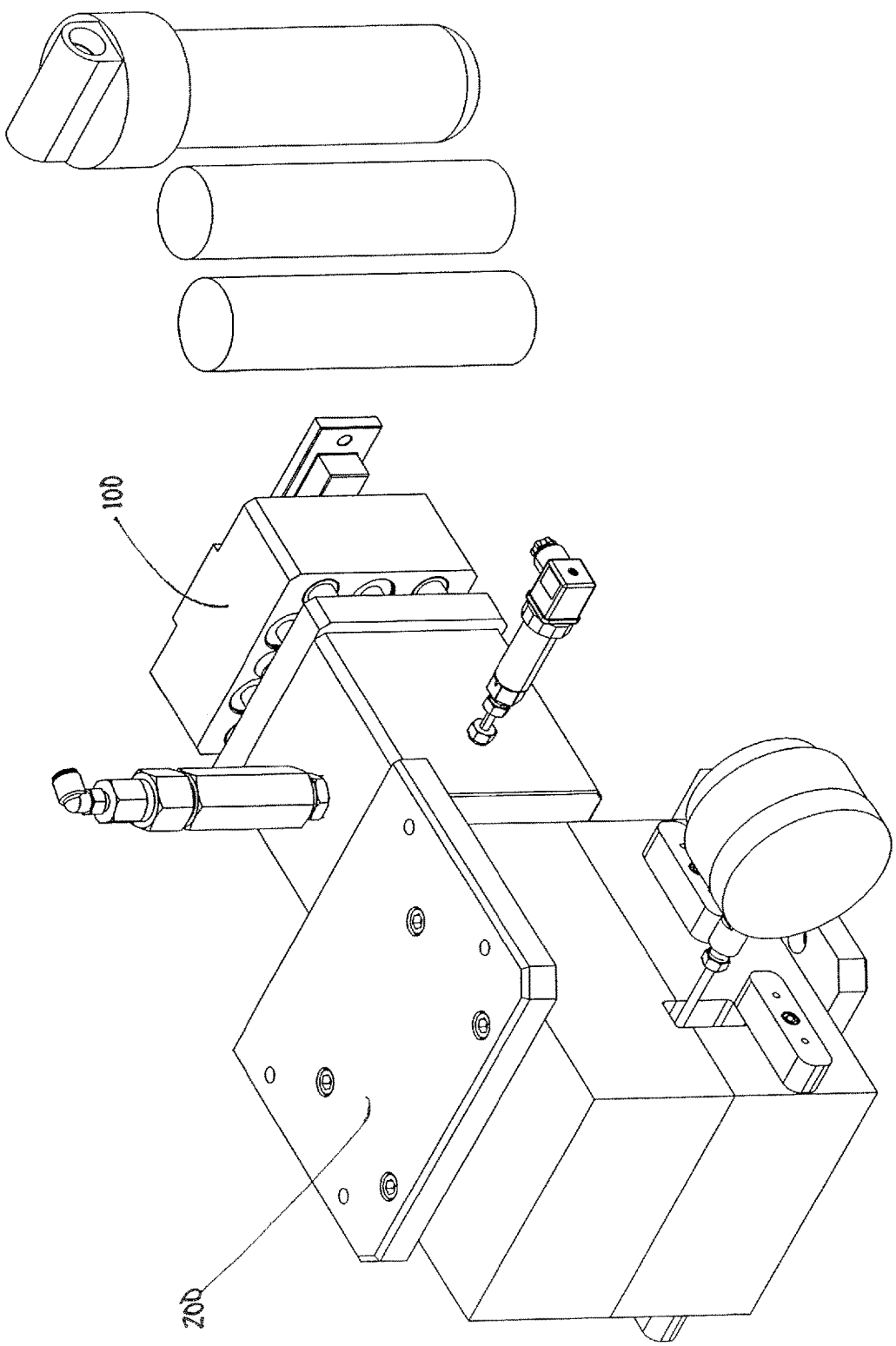
FIG. 1 is a perspective view of the main assembly of the hydroforming tool constructed in accordance with the present disclosure.

Referring now to the drawings in detail, wherein like-numbered elements refer to like elements throughout, FIG. 1 illustrates a preferred embodiment of the main assembly of the hydroforming tool (the tool). The tool comprises a ram tool subassembly 100 and a master die subassembly 200.

Figure 2:
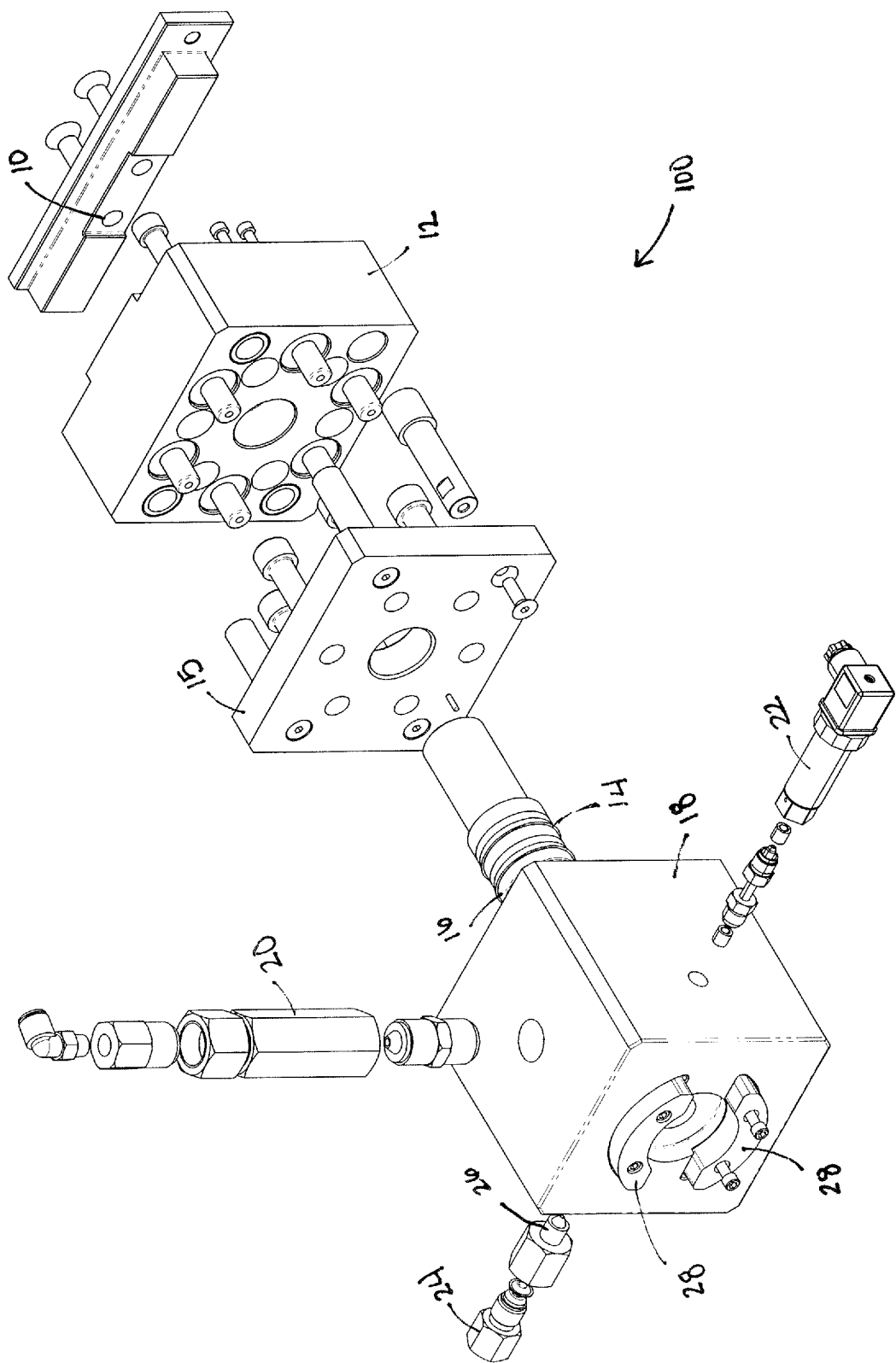
FIG. 2 is an exploded perspective view of the ram tool subassembly for the tool shown in FIG. 1.

FIG. 2 illustrates an exploded view of the elements of the ram tool subassembly 100. Moving away from the tool stick 10, the subassembly includes a back body 12, a piston assembly 14, a piston housing 16, and a pusher holder 18. The back body 12, the piston assembly 14, and the piston housing 16 may be substantially square in shape. The square shape aids the ram tool subassembly 100 in maintaining its structural integrity under the pressures used in hydroforming. However, examples are not so limited, and other shapes may be used for the back body 12, the piston assembly 14, and/or the piston housing 16. The back body 12, piston assembly 14, and piston housing 16 may be manufactured from a high-strength, fracture-resistant alloy, such as Hardox400. Examples are not so limited, however, and any high-strength and fracture resistant alloy or metal may be used to manufacture the back body 12, the piston assembly 14, and/or the piston housing 16.

The piston assembly further comprises a piston back plate 15. The piston housing 16 further comprises a check valve 20, a pressure transducer 22, and a pressure safety head 24. The pressure safety head 24 comprises a rupture disk 26 that allows for pressure relief in a situation where system pressure is exceeded, or is beyond the pressure targeted for proper hydroforming of a particular tube application. The pressure transducer 22 converts fluid pressure to an electrical signal for monitoring and controlling pressure in the ram tool subassembly 100, and in the piston housing 16 in particular. When connected to an electrical source and exposed to a pressure source, the pressure transducer 22 produces an electrical output signal that is proportional to the pressure applied. The check valve 20 allow for a one-way flow of a fluid into the ram tool subassembly 100. The pusher holder 18 further comprises opposing pusher blocks 28. A plurality of shafts and fasteners are also shown.

Figure 3:
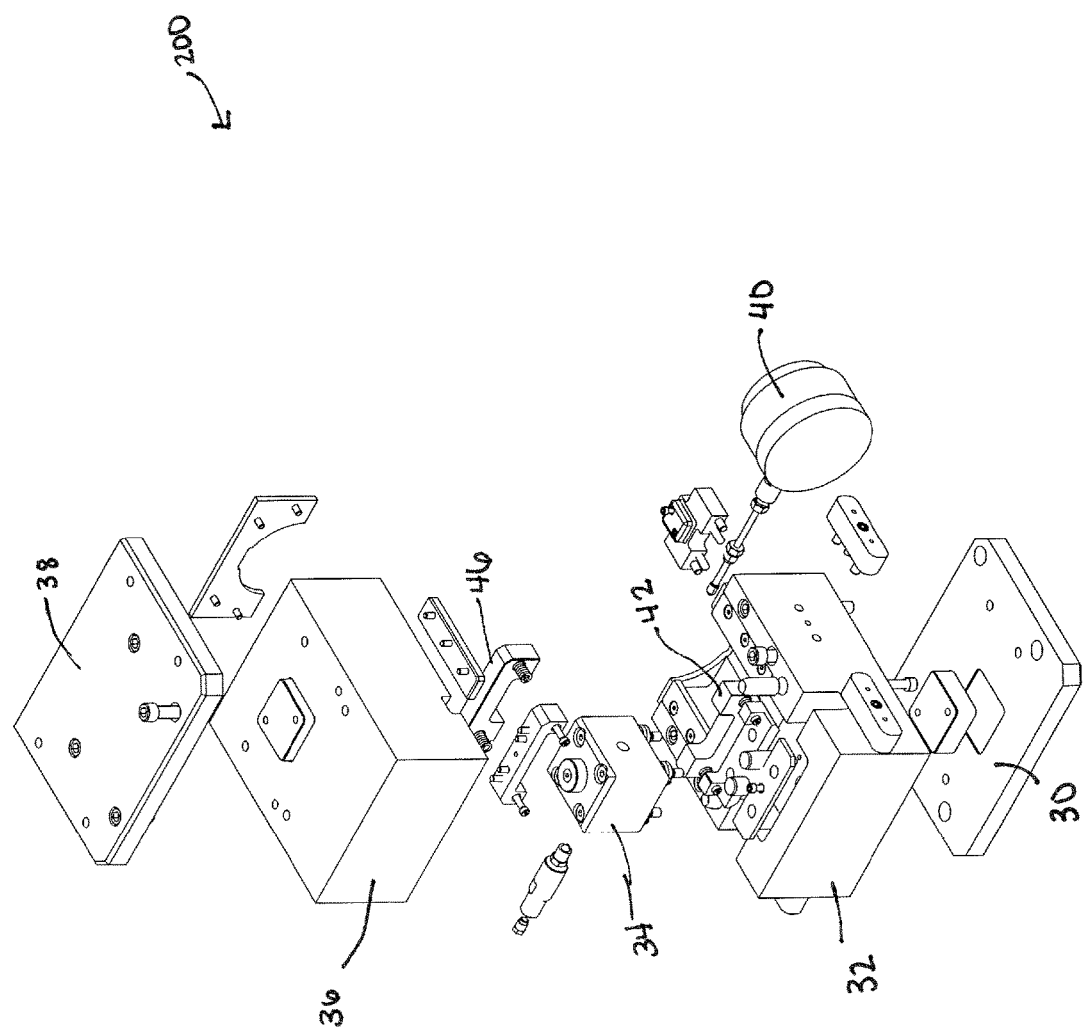
FIG. 3 is an exploded perspective view of the master die subassembly for the tool shown in FIG. 1.

Referring now to FIG. 3, an exploded view of the master die subassembly 200 that complements the ram tool subassembly 100 is shown. As shown, moving from bottom to top, the master die subassembly 200 comprises a bottom tooling plate 30, a bottom master jaw 32, a nose block 34, a top master jaw 36, and a top tooling plate 38. Pusher blocks 42 and 46 are provided for the bottom master jaw 32 and the top master jaw 36, respectively. A pressure gauge 40 is also provided.

In the present invention, an unformed tube (not shown) is loaded into a lower cavity of a sliding die, over the edge of a stationary sealing nose. The die is then clamped shut. The single ram nose is fed forward to seal the opposite end of the unformed tube. A lower pressure, but higher volume, pump then begins to fill the unformed tube. When the tube has been filled, the single ram cylinder, via the piston assembly 14, moves forward to compress the fluid. At the same time, the single ram cylinder is feeding in the material to form the raw tube to the desired shape. The pressure is created by filling the unformed tube with compressible liquid and using the ram cylinder, via the piston assembly 14, to generate the pressure necessary to form the tube in the shape desired.

The invention claimed is:

1. A system, comprising:
   a ram tool subassembly, wherein the ram tool subassembly further comprises:
   a tool stick;
   a back body;
   a piston assembly;
   a piston housing; and
   a pusher holder;
   a master die subassembly, wherein the master die subassembly further comprises:
   a bottom tooling plate;
   a bottom master jaw;
   a nose block to receive an unformed tube;
   a top master jaw; and
   a top tooling plate; and
   a compressible fluid source coupled to the ram tool subassembly, wherein:
   the compressible fluid source fills the unformed tube with a compressible fluid; and
   the ram tool subassembly moves forward to compress the fluid such that the compressible fluid is placed under pressure to form a formed tube from the unformed tube.

2. The system of claim 1, wherein the piston assembly further comprises a piston back plate.

3. The system of claim 1, wherein the piston housing further comprises:
   a check valve;
   a pressure transducer; and
   a pressure safety head.

4. The system of claim 3, wherein the pressure safety head further comprises a rupture disk.

5. The system of claim 3, wherein the pressure transducer is coupled to an electrical source such that the pressure transducer produces an electrical output signal when the pressure transducer is exposed to a pressure source.

6. The system of claim 3, wherein the check valve is a one-way flow valve.

7. The system of claim 1, wherein the pusher holder further comprises a plurality of opposing pusher blocks.

8. The system of claim 1, wherein the master die subassembly further comprises:
   a first pusher block for the bottom master jaw; and
   a second pusher block for the top master jaw.

9. The system of claim 1, wherein the master die subassembly further comprises a pressure gauge.

* * * * *